3,354,218
PROCESS FOR PREPARING 4-(2,6,6-TRIMETHYL-4-METHOXY - 1 - CYCLOHEXEN - 1 - YL) - 3 - BUTEN-2-ONE
Joseph Donald Surmatis, West Caldwell, N.J., assignor to Hoffmann-La Roche Inc., Nutley, N.J., a corporation of New Jersey
No Drawing. Filed May 10, 1963, Ser. No. 279,617
2 Claims. (Cl. 260—586)

This application is a continuation-in-part application of copending application Ser. No. 198,724, filed May 31, 1962, now abandoned.

The present invention relates to a novel process for the preparation of zeaxanthin dimethyl ether.

Zeaxanthin dimethyl ether is useful as a coloring agent for coloring feedstuffs and foodstuffs. It is a known compound, having been prepared from natural zeaxanthin.

The present process is a process for its total synthesis. The instant process is carried out by first treating β-ionone (I) with N-bromosuccinimide, followed by dehydrobromination of the reaction product with a dehydrobrominating agent such as dimethylaniline, pyridine, or other organic bases as diethylaniline, quinoline, etc. to form 4-(2,6,6-trimethyl - 1,3-cyclohexadien-1-yl)-3-buten-2-one (II). II is treated with methyl sulfate and methyl alcohol to form 4-(2,6,6-trimethyl-4-methoxy-1-cyclohexen-1-yl)-3-buten-2-one (III). II is reacted with ethyl haloacetate, preferably ethyl chloroacetate, by the Darzens reaction to give 4 - (2,6,6 - trimethyl - 4 - methoxy-1-cyclohexen-1-yl)-2-methyl-2-buten-1-al (IV). IV is treated with triethylorthoformate and phosphoric acid, followed by zinc chloride in ethyl acetate and ethyl vinyl ether and the resulting product is hydrolyzed with an acid hydrolyzing agent, e.g., a dilute solution of a mineral acid such as HCl, $H_2SO_4$, o-phosphoric acid, etc., or a strong organic acid, preferably acetic acid in the presence of sodium acetate to form 6 - (2,6,6 - trimethyl - 4-methoxy-1-cyclohexen-1-yl)-4-methyl-2,4-hexadien-1-al (V). V is treated with triethylorthoformate and phosphoric acid followed by treatment with zinc chloride in ethyl acetate and ethyl propenyl ether and the resulting product is hydrolyzed with an acid hydrolyzing agent, e.g., a dilute solution of a mineral acid such as HCl, $H_2SO_4$, o-phosphoric acid, etc., or a strong organic acid, preferably acetic acid in the presence of sodium acetate, to form 8-(2,6,6-trimethyl-4-methoxy-1 - cyclohexen - 1 - yl)-2,6-dimethyl-2,4,6-octatriene-1-al (VI). VI is condensed with acetylene dimagnesium halide, preferably the bromide, followed by hydrolysis of the resulting product using an acidic hydrolyzing agent, e.g., a dilute solution of a mineral acid, preferably sulfuric acid, an aqueous solution of ammonium chloride, etc., followed by dehydration of the hydrolyzed product using a dehydrating agent, e.g., a lower alkanol solution of a hydrogen halide such as ethanolic hydrogen chloride solution, a dilute solution of $H_2SO_4$ in a lower alkanol, $POCl_3$ in pyridine, etc., to yield 15,15'-dehydrozeaxanthin dimethyl ether (VII). VII is hydrogenated in the presence of a lead-palladium-calcium carbonate catalyst to form trans-zeaxanthin dimethyl ether (VIII).

The reaction scheme is given below:

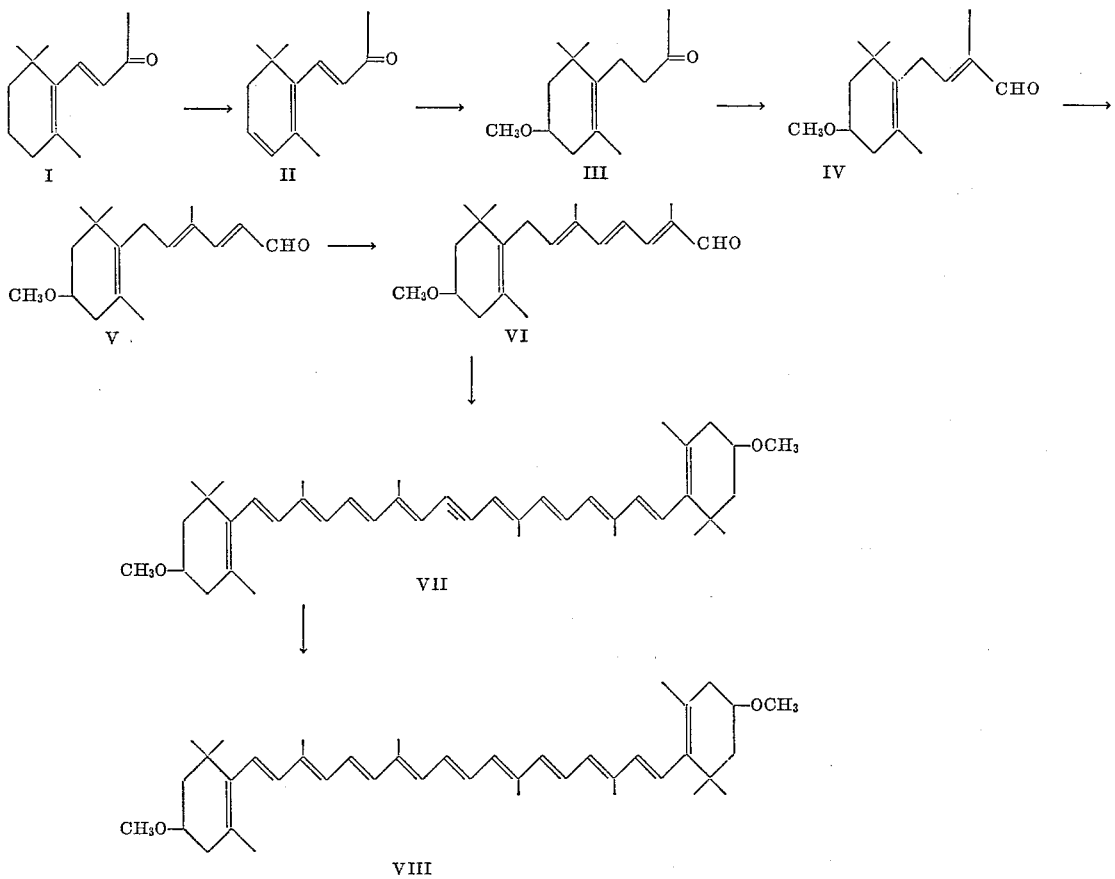

The above process will be better understood by reference to the following example, which is given for illustration purposes only and is not meant to limit the invention.

EXAMPLE (a) *Preparation of 4-(2,6,6-trimethyl-1,3-cyclohexadien-1-yl)-3-buten-2-one (II)*

366 g. of β-ionone (I) is placed in a 5-liter flask fitted with a stirrer, thermometer, and nitrogen inlet tube. To this are added 2.5 liters of carbon tetrachloride, 200 g. of sodium bicarbonate, 160 g. of calcium oxide, and 428 g. of N-bromosuccinimide, in the order named. The reaction mixture is heated with stirring to a temperature of 72° C. and the heating source removed. The temperature continues to rise to 80° C. At this temperature vigorous reflux commences which lasts for about 10 minutes. Stirring is continued until the temperature drops to 60° C. Then 550 ml. of dimethylaniline is added to the reaction mixture, and the mixture cooled to 40° C. The solid is filtered off by suction with a glass sintered funnel and carefully washed with additional carbon tetrachloride. The carbon tetrachloride is removed from the filtrate under the vacuum of a water pump. The residue is heated with stirring under a blanket of nitrogen for 2 hours at 90–95° C. The residue is allowed to cool to 60° C. and 180 ml. of pyridine are added. The mixture is heated with stirring to 90–95° C. and held at this temperature for an additional hour. The reaction mixture is allowed to cool to room temperature, and 2 liters of ice water and 2 liters of petroleum ether (30–60° C.) are added and thoroughly mixed. The water layer is separated and extracted with 1 liter of petroleum ether. The water layer is discarded and the petroleum ether layers combined and washed six times, each time with 1 liter of 5% sulfuric acid; then with 1 liter of 5% sodium carbonate; and lastly with 1 liter of water. The petroleum ether is removed under the vacuum of a water pump, leaving 345 g. of crude product which is distilled under high vacuum using an oil pump. 199 g. of 4-(2,6,6 - trimethyl - 1,3 - cyclohexadien-1-yl) 3-buten-2-one (II) distilling at 80–86° C. at 0.2 mm. pressure is obtained.

(b) *Preparation of 4-(2,6,6-trimethyl-4-methoxy-1-cyclohexen-1-yl)-3-buten-2-one (III)*

72 cc. of concentrated sulfuric acid are added to 1800 ml. of methyl alcohol in a 5-liter flask fitted with a stirrer and a thermometer. The solution is cooled to 2–5° C. and 180 g. of 4-(2,6,6 - trimethyl - 1,3 - cyclohexadien-1-yl)-3-buten-2-one (II) added all at once. The solution is stirred under a blanket of nitrogen for 25 hours at a temperature of 2–5° C. and the reaction mixture is treated with 1800 cc. of ice water. Then with vigorous stirring, 250 cc. of 50% sodium hydroxide is added. The stirring is continued for an additional 30 minutes and the product extracted with 2 liters of petroleum ether (30–60° C.). The petroleum ether layer is washed twice, each time with 1 liter of water, dried over anhydrous calcium sulfate, and the solvent removed by distillation under the vacuum of a water pump. 195 g. of crude product is obtained which is distilled at 80–86° C. at 0.08 mm. pressure to yield 104 g. of 4 - (2,6,6 - trimethyl - 4 - methoxy-1-cyclohexen-1-yl)-3-buten-2-one (III).

(c) *Preparation of 4-(2,6,6-trimethyl-4-methoxy-1-cyclohexen-1-yl)-2-methyl-2-buten-1-al (IV)*

In a 3-liter, 3-necked flask fitted with a stirrer, thermometer, and nitrogen inlet tube are placed 98.5 g. of 4-(2,6,6 - trimethyl - 4 - methoxy - 1 - cyclohexen - 1-yl) 3-buten-2-one (III). 145 g. of ethyl chloracetate, and 46 ml. of methyl alcohol. The resulting solution is cooled to −20° C. and 81 g. of sodium methylate added in small portions over the period of 1 hour. The temperature is maintained at −6° to −10° C. during the addition. The reaction mixture is then stirred under a blanket of nitrogen for 90 minutes at 0° C. The temperature is lowered to −5° C., and the solution consisting of 60 g. of sodium hydroxide in 420 ml. of methanol is poured in all at once causing the temperature to rise to 20° C. Stirring is continued at this temperature for 45 minutes. The reaction mixture is cooled to 10° C. and 1150 ml. of ice water are added. The mixture is stirred for 1 hour and the product extracted 3 times, each time with 500 ml. of petroleum ether (boiling point 30–60° C.). The petroleum ether extracts are combined, washed with water, dried over anhydrous calcium sulfate, and the solvent removed under the vacuum of a water pump. 78 g. of crude product is obtained, which is fractionally distilled; boiling point 95–100° C. at 0.1 mm. pressure yielding 67.8 g. of 4-(2,6,6 - trimethyl - 4 - methoxy - 1 - cyclohexen-1-yl)-2-methyl-2-buten-1-al (IV).

(d) *Preparation of 6-(2,6,6-trimethyl-4-methoxy-1-cyclohexen-1-yl)-4-methyl-2,4-hexadien-1-al (V)*

In a 2-liter flask fitted with a mechanical stirrer, condenser, thermometer, and nitrogen inlet tube is placed 200 g. of 4-(2,6,6 - trimethyl - 4 - methoxy - 1 cyclohexen-1 - yl) - 2 - methyl - 2 - buten - 1-al (IV). 160 ml. of triethylorthoformate, and 2 ml. of 85% phosphoric acid. The resulting solution is stirred at room temperature under a blanket of nitrogen for 22 hours. The solution is then cooled to −25° C. and 20 ml. of a 10% solution of zinc chloride in ethyl acetate is added all at once. Then 152 ml. of freshly distilled ethyl vinyl ether is dropped in at −10° C. during the course of 1.5 hours. The reaction is stirred under nitrogen for 10 hours at room temperature. Then 84 g. of sodium acetate, 720 ml. of glacial acetic acid, and 72 ml. of water are added in the order named and the mixture heated with stirring to 95° C. The condenser is fitted for distillation and the heating and stirring continued for two hours. During this time 150 ml. of distillate is obtained, which is discarded. The cooled reaction mixture is diluted with 2 liters of water and extracted 3 times, each time with 500 ml. of benzene. The benzene extracts are combined, washed with water, and concentrated under vacuum to a syrup. 251 g. of crude product is obtained. Upon crystallization from petroleum ether, 133 g. of 6-(2,6,6-trimethyl -4-methoxy-1-cyclohexen-1-yl)-4-methyl-2,4-hexadien-1-al (V) is obtained as a pale yellow crystalline solid melting at 72° C. Upon further recrystallization from petroleum ether an analyticaly pure sample is obtained; melting point 78° C.

(e) *Preparation of 8-(2,6,6-trimethyl-4-methoxy-1-cyclohexen-1-yl)-2,6-dimethyl-2,4,6-octatriene-1-al (VI)*

In a 1-liter flask there are placed 53 g. of 6-(2,6,6-trimethyl - 4 - methoxy - 1 - cyclohexen - 1 - yl)-4-methyl-2,4-hexadien-1-al (V), 30 ml. of triethylorthoformate, and 0.5 ml. of 85% phosphoric acid dissolved in 20 ml. of triethylorthoformate. The resulting solution is stirred at room temperature under a blanket of nitrogen for 60 hours. The solution is then cooled to −10° C. and 5 ml. of a 10% solution of zinc chloride in ethyl acetate is added. 30 cc. of freshly distilled ethyl propenyl ether is dropped in during the course of 1 hour at a temperature maintained in the range of 0° to −10° C. The cooling bath is removed and the stirring continued for 10 hours. Then 14 g. of sodium acetate, 120 ml. of glacial acetic acid, and 15 ml. of water are added in the order named. The condenser is fixed for distillation and the reaction stirred at 95–100° C. for 2 hours. 37 ml. of the distillate results which is discarded. The reaction mixture is cooled, diluted with 200 ml. of water, and extracted three times, each time with 200 ml. of petroleum ether. The extracts are combined, washed with water, dried over anhydrous calcium sulfate and concentrated to a syrup under vacuum. 70 g. of 8-(2,6,6 - trimethyl - 4 - methoxy-1-cyclohexen - 1 - yl - 2,6 - dimethyl - 2,4,6 - octatriene-1-al (VI) is obtained, which is purified by vacuum distillation yielding 48.4 g. of product; boiling point 94° C. at 6 microns. The sample is crystallized from petroleum ether; melting point 42° C.

(f) *Preparation of 15,15'-dehydrozeaxanthin dimethyl ether (VII)*

Acetylene dimagnesium bromide is prepared by bubbling dry acetylene for 20 hours into a Grignard reagent reagent prepared from 38.8 g. of magnesium, 162 g. of ethyl bromide, and 620 ml. of ether. Then a solution of 120 g. of 8-(2,6,6 - trimethyl - 4 - methoxy - 1 - cyclohexen - 1 - yl) - 2,6 - dimethyl - 2,4,6 - octatriene-1-al (VI) in 500 ml. of ether is added rapidly and the solution heated at reflux for 2 hours. The reaction mixture is then poured onto ice and acidified with 5% sulfuric acid. The ether layer is separated, washed with sodium bicarbonate, and then with water until neutral. The ether layer is then dried over anhydrous calcium sulfate and the solvent removed under vacuum. The residue, a pale yellow waxy solid, is then dissolved in 1200 ml. of ether and 300 ml. of methanol. To the resulting mixture is added 300 ml. of a solution of 6 N hydrogen chloride in isopropyl alcohol. The mixture is stirred for 10 minutes and then maintained at 0° C. for 10 hours. The resulting solids are filtered in an inert atmosphere and washed successively with 5% sodium bicarbonate solution, water, and cold methanol. The solids are crystallized from benzene to yield 36.1 g. of 15,15' - dehydrozeaxanthin dimethyl ether (VII); melting point 147° C.

(g) *Preparation of trans-zeaxanthin dimethyl ether (VIII)*

A suspension of 27 g. of 15,15'-dehydrozeaxanthin dimethyl ether (VII) in 300 ml. of petroleum ether is hydrogenated in the presence of 2.5 g. of lead-palladium-calcium carbonate catalyst and 2.5 ml. of 10% quinoline in petroleum ether until 1 molar equivalent of hydrogen is consumed. The suspension is then heated to the boiling point, the catalyst filtered off, and the catalyst washed thoroughly with additional portions of hot petroleum ether. The solvents are removed from the filtrate until a pasty mass remains, and the pasty mass heated at 90° C. for 16 hours. The solvent is filtered off and the precipitate recrystallized from benzene to give 19 g. (70%) of trans-zeaxanthin dimethyl ether (VIII); melting point 176° C.

Variations in the process of the invention can be undertaken by those skilled in the art without departing from the scope or spirit of the invention.

I claim:
1. A process for preparing 4-(2,6,6 - trimethyl - 4-methoxy - 1 - cyclohexen - 1 - yl) - 3 - buten - 2 - one (III) from 4-(2,6,6 - trimethyl - 1,3 - cyclohexadien-1-yl)-3-buten-2-one (II) comprising treating (II) with methyl sulfate to form III.
2. A process for preparing 4-(2,6,6 - trimethyl - 4-methoxy - 1 - cyclohexen - 1 - yl) - 3 - buten-2-one (III) from β-ionone comprising
   (a) reacting β-ionone with N-bromosuccinimide and dehydrobrominating the reaction product with a dehydrobrominating agent to yield 4-(2,6,6 - trimethyl-1,3-cyclohexadien-1-yl)-3-buten-2-one (II) and
   (b) treating (II) with methyl sulfate to form III.

References Cited

UNITED STATES PATENTS

| | | | |
|---|---|---|---|
| 2,730,549 | 1/1956 | Isler et al. | 260—598 |
| 2,819,298 | 1/1958 | Isler et al. | 260—598 |
| 2,871,267 | 1/1959 | Petracek et al. | |
| 2,898,385 | 8/1959 | Isler et al. | |
| 2,987,550 | 6/1961 | Stieg et al. | 260—598 |
| 3,068,292 | 12/1962 | Reedy et al. | 260—598 |

FOREIGN PATENTS 843,438  8/1960  Great Britain.

OTHER REFERENCES

Wagner et al.: Synthetic Organic Chemistry, pp. 232–3 (1953).

BERNARD HELFIN, *Primary Examiner.*

L. ZITVER, *Examiner.*

L. WEINBERGER, *Assistant Examiner.*

UNITED STATES PATENT OFFICE
CERTIFICATE OF CORRECTION

Patent No. 3,354,218                            November 21, 1967

Joseph Donald Surmatis

It is certified that error appears in the above identified patent and that said Letters Patent are hereby corrected as shown below:

Column 1, line 28, "II is reacted" should read -- III is reacted --. Column 2, formula III should appear as shown below

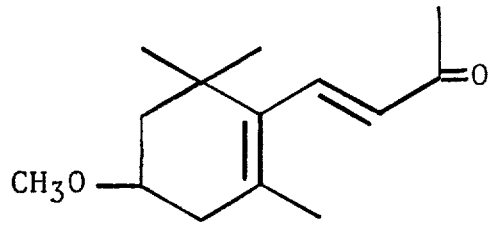

Column 3, line 70, "chloracetate" should read -- chloroacetate --. Column 4, line 46, "analyticaly" should read -- analytical --. Column 5, lines 8 and 9, cancel "reagent", second occurrence.

Signed and sealed this 3rd day of March 1970.

(SEAL)
Attest:

EDWARD M. FLETCHER, JR.                      WILLIAM E. SCHUYLER, JR
Attesting Officer                               Commissioner of Patents